United States Patent
Hamane et al.

(10) Patent No.: US 11,788,482 B1
(45) Date of Patent: Oct. 17, 2023

(54) METHOD FOR CONTROLLING INTERNAL COMBUSTION ENGINE AND DEVICE FOR CONTROLLING INTERNAL COMBUSTION ENGINE

(71) Applicant: Nissan Motor Co., Ltd., Yokohama (JP)

(72) Inventors: Shouta Hamane, Kanagawa (JP); Tadashi Iwamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/006,736

(22) PCT Filed: Sep. 16, 2020

(86) PCT No.: PCT/JP2020/035033
§ 371 (c)(1),
(2) Date: Jan. 25, 2023

(87) PCT Pub. No.: WO2022/059082
PCT Pub. Date: Mar. 24, 2022

(51) Int. Cl.
*F02D 41/06* (2006.01)
*F02D 41/04* (2006.01)
*F02D 29/02* (2006.01)

(52) U.S. Cl.
CPC ........... *F02D 41/062* (2013.01); *F02D 29/02* (2013.01); *F02D 41/042* (2013.01)

(58) Field of Classification Search
CPC ........... F02D 29/02; F02D 41/06; Y02T 10/62
See application file for complete search history.

(56) References Cited

U.S. PATENT DOCUMENTS

| 2011/0061628 A1* | 3/2011 | Fujita | F02D 35/023 123/406.47 |
| 2013/0297191 A1* | 11/2013 | Gibson | B60K 6/387 701/112 |
| 2014/0311443 A1* | 10/2014 | Leone | F02B 47/02 123/25 R |
| 2019/0072049 A1* | 3/2019 | Suzuki | F01N 9/00 |

FOREIGN PATENT DOCUMENTS

| JP | 2003-214192 A | 7/2003 |
| JP | 2010-223007 A | 10/2010 |
| JP | 2013-194584 A | 9/2013 |
| JP | 2016-70140 A | 5/2016 |
| JP | 2017-203401 A | 11/2017 |

* cited by examiner

*Primary Examiner* — John Kwon
(74) *Attorney, Agent, or Firm* — Global IP Counselors, LLP

(57) ABSTRACT

In an internal combustion engine, fuel injection is stopped to automatically stop the engine when automatic stop conditions are met. The engine is started in response to a request to restart the engine while an engine speed is decreasing due to an automatic stoppage by resuming fuel injection if the engine speed is equal to or greater than a combustion recoverable rotational speed threshold, and by using an electric motor if the engine speed is less than the combustion recoverable rotational speed threshold. When the engine speed of the internal combustion engine falls below the combustion recoverable rotational speed threshold while the engine speed is decreasing due to an automatic stoppage, an amount of air entering cylinders is reduced to be less than before the engine speed fell below the combustion recoverable rotational speed threshold.

5 Claims, 3 Drawing Sheets

METHOD FOR CONTROLLING INTERNAL COMBUSTION ENGINE AND DEVICE FOR CONTROLLING INTERNAL COMBUSTION ENGINE

CROSS-REFERENCE TO RELATED APPLICATIONS

This application is a U.S. national stage application of International Application No. PCT/JP2020/035033, filed on Sep. 16, 2020.

BACKGROUND

Technical Field

The present invention relates to a method and device for controlling an internal combustion engine.

Background Information

Idle stop control for combustion engines is known in the prior art. In idle stop control, the internal combustion engine is automatically stopped when predetermined automatic stop conditions are met during idling, and the internal combustion engine is automatically restarted when a predetermined automatic restart condition is met during the automatic stop.

For example, in Japanese Patent Application Publication No. 2017-203401 A (hereinafter referred to as Patent Document 1), when it is determined that an engine speed is within a predetermined rotational speed range including a resonance band (resonance range) of an internal combustion engine during a rotation drop period when the engine speed drops to zero after the internal combustion engine is automatically stopped, reverse torque, which is torque on a reverse rotation side, is applied to a crankshaft of the internal combustion engine by a motor generator to increase the speed at which the engine speed drops.

In Patent Document 1, when the engine speed is within the predetermined rotational speed range, reverse torque is applied to the internal combustion engine by power driving or regenerative power generation performed by the motor generator, and the speed at which the engine speed drops is increased, thereby shortening the time required for the engine speed to pass through the resonance band.

In Patent Document 1, when reverse torque is applied to the internal combustion engine, whether to the motor generator is to perform power driving or regenerative power generation is assessed on the basis of various parameters.

However, when the engine speed is low, such as when passing through the resonance band, power generation in the motor generator is hardly possible. Therefore, in Patent Document 1, there is a risk that it will not be possible to apply sufficient reverse torque in the predetermined rotational speed range including the resonance band, or to quickly reduce the engine speed.

Therefore, in Patent Document 1, there is a risk that when the internal combustion engine is automatically stopped, it will not be possible to minimize vibration when the engine speed passes through the resonance band.

SUMMARY

In an internal combustion engine of the present invention, when there is a request to restart the internal combustion engine while an engine speed of the internal combustion engine is decreasing due to an automatic stoppage, the internal combustion engine is started by resuming fuel injection if the engine speed is equal to or greater than a predetermined rotational speed threshold at which restarting is possible only by fuel injection, and the internal combustion engine is started by causing a crankshaft to rotate using an electric motor if the engine speed of the internal combustion engine is lower than the rotational speed threshold. When the engine speed of the internal combustion engine falls below the rotational speed threshold while the engine speed is decreasing due to an automatic stoppage, an amount of air entering cylinders is reduced to be less than before the engine speed fell below the rotational speed threshold.

When the engine speed is equal to or greater than the predetermined rotational speed threshold, it is possible to ensure the amount of air in the cylinders and prepare for starting (combustion in) the internal combustion engine by resuming fuel injection.

When the engine speed is lower than the predetermined rotational speed threshold, compression reaction force can be reduced and fluctuation in the rotation of the internal combustion engine can be minimized by reducing the amount of air entering the cylinders (intake air amount). In the internal combustion engine, it is possible to minimize vibration when the engine speed passes through a predetermined resonance band of the internal combustion engine, due to the reduction in the compression reaction force due to the decrease in the amount of air entering the cylinders.

BRIEF DESCRIPTION OF THE DRAWINGS

Referring now to the attached drawings which form a part of this original disclosure.

DETAILED DESCRIPTION

Figure 1:
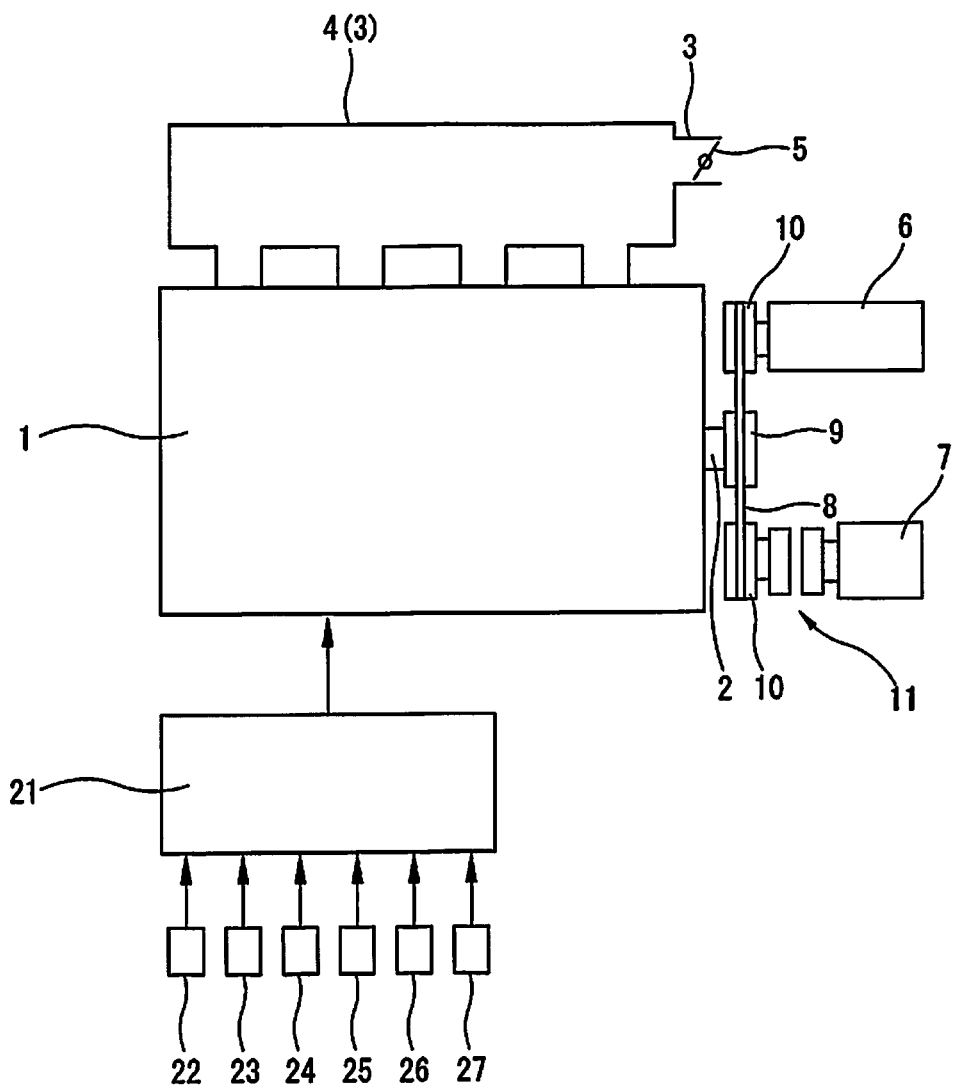
FIG. 1 is an explanatory diagram schematically depicting an outline of a system configuration of an internal combustion engine to which the present invention is applied.

An embodiment of the present invention is described below on the basis of the drawings. FIG. 1 is an explanatory diagram schematically depicting an outline of a system configuration of an internal combustion engine 1 to which the present invention is applied.

The internal combustion engine 1 is, for example, a multi-cylinder spark ignition gasoline engine, and is mounted in an automobile or another vehicle. The internal combustion engine 1 transmits, for example, rotation of a crankshaft 2 as drive force to driving wheels of the vehicle. The internal combustion engine 1 may be a diesel engine.

Intake air is distributed to each cylinder of the internal combustion engine 1 via a collector 4 forming a part of an intake passage 3. An electric throttle valve 5 that adjusts the amount of air taken into the internal combustion engine 1 is disposed upstream of the collector 4. The throttle valve 5 is equivalent to an air amount adjustment part capable of adjusting the amount of air supplied into the cylinders, is provided in the intake passage 3, and is positioned upstream of the collector 4.

The internal combustion engine 1 has a fuel injection valve (not shown) and a spark plug (not shown). An amount of fuel injected through the fuel injection valve, a fuel injection timing of the fuel injection valve, an ignition timing of the spark plug, a pressure of fuel supplied to the fuel injection valve, and the like are optimally controlled by a control unit 21, which will be described later.

The internal combustion engine 1 drives: an alternator 6, which generates power in order to charge an onboard battery; a compressor 7 for an air conditioner; and the like.

In this embodiment, the alternator 6 is a "motor generator," and is capable of driving the crankshaft 2 of the internal combustion engine 1 by power running. In other words, the alternator 6 is equivalent to an electric motor capable of causing the crankshaft 2 to rotate and starting (cranking) the internal combustion engine 1.

When there is a demand to drive the alternator 6, the air conditioner, and other auxiliary devices and these auxiliary devices are driven, an auxiliary device load is exerted on the internal combustion engine 1 and the load of the internal combustion engine 1 increases.

Rotation of the crankshaft 2, which is transmitted via a belt 8 and a crank pulley 9, serves as a motive power source for the air conditioner and other auxiliary devices driven by the internal combustion engine 1. The crank pulley 9 is integrally attached to an end part of the crankshaft 2. The belt 8 is wound around the crank pulley 9 and an auxiliary-device-side pulley 10.

An electromagnetic clutch 11 for the air conditioner is provided between the internal combustion engine 1 and the compressor 7 of the air conditioner. Specifically, the electromagnetic clutch 11 for the air conditioner is provided between the compressor 7 of the air conditioner and the auxiliary-device-side pulley 10 to which the rotation of the crankshaft 2 is transmitted.

The internal combustion engine 1 is disconnected from the compressor 7 of the air conditioner by releasing the electromagnetic clutch 11 for the air conditioner. The electromagnetic clutch 11 for the air conditioner is disengaged by a command from the control unit 21 when the air conditioner is not used. In other words, when the internal combustion engine 1 does not use the air conditioner, the electromagnetic clutch 11 for the air conditioner is disengaged, and the load on the compressor 7 of the air conditioner is reduced.

Regarding those devices among the various auxiliary devices driven by the internal combustion engine 1 that are capable of reducing the load of the internal combustion engine 1 when disconnected from the internal combustion engine 1 when stopped, as is the air conditioner, an electromagnetic clutch may be provided between the internal combustion engine 1 and any of these devices, and the electromagnetic clutch may be disengaged when the device stops.

The control unit 21 receives detection signals from a crank angle sensor 22 that detects a crank angle of the crankshaft 2, an accelerator position sensor 23 that detects an amount by which an accelerator pedal (not shown) is depressed, a vehicle speed sensor 24 that detects speed of the vehicle, a brake sensor 25 that detects an amount by which a brake pedal (not shown) is depressed, a catalyst temperature sensor 26 that detects a catalyst temperature of an exhaust purification catalyst (not shown) provided in an exhaust passage (not shown) of the internal combustion engine 1, a pressure sensor 27 that detects a pressure (air pressure) in the collector 4, and other various sensors.

The control unit 21 calculates load (engine load) required by the internal combustion engine 1 using the detection value of the accelerator position sensor 23.

The control unit 21 is capable of detecting a state of charge (SOC), which is a ratio of a remaining charge to a charge capacity of an onboard battery (not shown). In other words, the control unit 21 is equivalent to a battery SOC detection part.

The crank angle sensor 22 is capable of detecting an engine speed (number of engine rotations) of the internal combustion engine 1.

When predetermined automatic stop conditions are met while the vehicle is traveling or stopped, the fuel supply is stopped and the internal combustion engine 1 stops automatically. The internal combustion engine 1 then restarts when a predetermined automatic restart condition is met during the automatic stop. In other words, the control unit 21 automatically stops the internal combustion engine 1 when the predetermined automatic stop conditions are met, and automatically restarts the internal combustion engine 1 when a predetermined automatic restart condition is met.

The automatic stop conditions of the internal combustion engine 1 are, for example, that the accelerator pedal is not depressed, that the battery SOC of the onboard battery is greater than a predetermined battery threshold SOCth, that the catalyst temperature of the exhaust purification catalyst is higher than a predetermined first catalyst temperature threshold T1, and the like.

The internal combustion engine 1 automatically stops when these automatic stop conditions have all been met. In other words, the control unit 21 automatically stops the internal combustion engine 1 when these automatic stop conditions have all been met while the internal combustion engine 1 is operating. That is, the control unit 21 is equivalent to a first control part that stops fuel injection to automatically stop the internal combustion engine 1 when predetermined automatic stop conditions are met.

Conditions for automatically restarting the internal combustion engine 1 are, for example, that the accelerator pedal is depressed, that the battery SOC of the onboard battery is equal to or less than the predetermined battery threshold SOCth, that the catalyst temperature of the exhaust purification catalyst is equal to or less than the predetermined first catalyst temperature threshold T1, and the like.

The internal combustion engine 1 restarts when there is a restart request during an automatic stop. In other words, the control unit 21 restarts the internal combustion engine 1 when any of these automatic restart conditions is met during an automatic stop of the internal combustion engine 1. For example, the automatically stopped internal combustion engine 1 restarts when the battery SOC of the onboard battery becomes equal to or less than battery threshold SOCth, which is a predetermined value.

Examples of an automatic stop of the internal combustion engine 1 include an idle stop, a "coast stop," and a "sailing stop."

An idle stop is carried out when automatic stop conditions such as, for example, those described above are met while the vehicle has temporarily stopped. The idle stop is canceled when any automatic restart condition such as, for example, those described above is met.

A coast stop is carried out when automatic stop conditions such as, for example, those described above are met while the vehicle is traveling. The coast stop is canceled when any automatic restart condition such as, for example, those described above is met. A coast stop is an automatic stopping of the internal combustion engine 1 during deceleration with the brake pedal depressed at, for example, a low vehicle speed.

A sailing stop is carried out when automatic stop conditions such as, for example, those described above are met while the vehicle is traveling. The sailing stop is canceled when any automatic restart condition such as, for example, those described above is met. A sailing stop is an automatic stopping of the internal combustion engine 1 during inertia traveling with the brake pedal not depressed at, for example, a medium to high vehicle speed.

When there has been a request to restart the internal combustion engine 1 during a decrease in the engine speed of the internal combustion engine 1 due to an automatic stop, the control unit 21 starts (causes combustion to occur in) the internal combustion engine 1 by resuming fuel injection if the engine speed of the internal combustion engine 1 is equal to or greater than a predetermined combustion recoverable rotational speed threshold R1 (rotational speed threshold) at which restarting is possible only by fuel injection, and rotatably drives the crankshaft 2 using the alternator 6 to start (crank) the internal combustion engine 1 if the engine speed of the internal combustion engine 1 is lower than the combustion recoverable rotational speed threshold R1. Furthermore, when the engine speed of the internal combustion engine 1 falls below the combustion recoverable rotational speed threshold R1 during a decrease in the engine speed due to an automatic stop, the control unit 21 controls the throttle valve 5 so that the amount of air entering the cylinders is less than before the engine speed falls below the combustion recoverable rotational speed threshold R1. That is, the control unit 21 is equivalent to a second control part. The combustion recoverable rotational speed threshold R1 is a value of, for example, about 600 rpm.

It is thereby possible with the internal combustion engine 1 to ensure the amount of air in the cylinders and prepare for starting (combustion in) the internal combustion engine 1 by resuming fuel injection when, after the automatic stop conditions have been met, the engine speed is equal to or greater than the combustion recoverable rotational speed threshold R1.

When the engine speed is lower than the combustion recoverable rotational speed threshold R1 after the automatic stop conditions of the internal combustion engine 1 have been met, it is possible to reduce compression reaction force and minimize fluctuation in the rotation of the internal combustion engine 1 by reducing the amount of air entering the cylinders (intake air amount). It is possible to minimize vibration in the internal combustion engine 1 when the engine speed passes through a predetermined resonance band (resonance range) of the internal combustion engine 1 due to the reduction in compression reaction force caused by a reduction in the amount of air entering the cylinders.

This resonance band corresponds to a rotational speed range (e.g., an engine speed of 300-500 rpm) lower than the engine speed during idling of the internal combustion engine 1. That is, the motive power transmission system of the internal combustion engine 1 has a resonance band in which resonance occurs when the engine speed is in a range between an engine resonance rotational speed upper limit Ru and an engine resonance rotational speed lower limit $R_L$.

When the control unit 21 automatically stops the internal combustion engine 1 while the alternator 6 is generating power or while the air conditioner is in use, the control unit 21 stops the generating of power by the alternator 6 or the use of the air conditioner and controls the throttle valve 5 so that the amount of air entering the cylinders is less than before the generating of power by the alternator 6 or the use of the air conditioner was stopped. Specifically, when the control unit 21 automatically stops the internal combustion engine 1 during operation of the auxiliary devices driven by the rotation of the crankshaft 2 of the internal combustion engine 1, the control unit 21 stops these auxiliary devices and controls the throttle valve 5 so that the amount of air entering the cylinders is less than before the auxiliary devices were stopped.

When the throttle valve 5 is closed to reduce the amount of air entering the cylinders (intake air amount), there is a possibility that the amount of air entering the cylinders cannot be sufficiently reduced before the engine speed passes through the resonance band of the internal combustion engine 1, depending on the responsiveness of the amount of air entering the cylinders or the deceleration of the engine speed.

Therefore, when the internal combustion engine 1 is automatically stopped, the amount of air entering the cylinders can be reduced more quickly than before the engine speed passes through the predetermined resonance band of the internal combustion engine 1, by stopping the alternator 6, the air conditioner, and the other auxiliary devices to reduce the amount of air needed to start combustion.

After the engine speed has passed through the predetermined resonance band of the internal combustion engine 1, the control unit 21 increases the amount of air entering the cylinders to be greater than when the engine speed passes through the predetermined resonance band of the internal combustion engine 1. Specifically, when the engine speed becomes equal to or less than the engine resonance rotational speed lower limit $R_L$, the control unit 21 increases the amount of air entering the cylinders to be greater than when the engine speed is between the engine resonance rotational speed upper limit Ru and the engine resonance rotational speed lower limit $R_L$.

After the engine speed has passed through the resonance band of the internal combustion engine 1, the influence of vibration due to the compression reaction force becomes small. Therefore, after the engine speed has passed through the resonance band of the internal combustion engine 1, the internal combustion engine 1 can be quickly started when a request to restart the internal combustion engine 1 is generated, by opening the throttle valve 5 to return the amount of air entering the cylinders to the amount of air needed to start the internal combustion engine 1.

Figure 2:
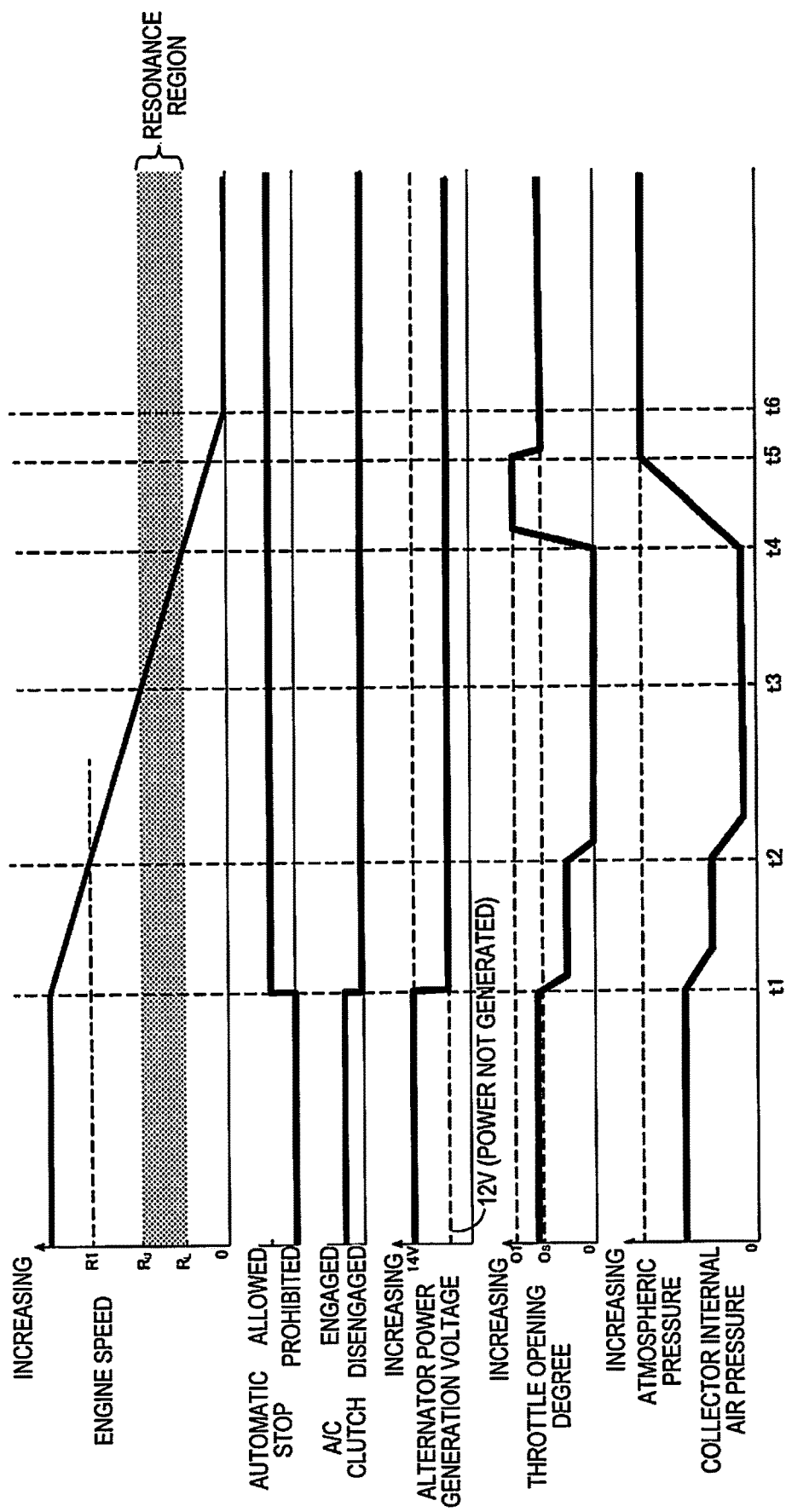
FIG. 2 is a timing chart indicating states of control of an internal combustion engine after automatic stop conditions have been met.

FIG. 2 is a timing chart indicating states of control of the internal combustion engine 1 after the automatic stop conditions have been met.

In FIG. 2, the automatic stop conditions are met at time t1. Automatic stoppage of the internal combustion engine 1 is allowed at time t1. When automatic stoppage of the internal combustion engine 1 is allowed, fuel injection from the fuel injection valve is stopped in the internal combustion engine 1.

In FIG. 2, the engine speed gradually decreases from time t1 onward, and passes through the resonance band of the internal combustion engine 1 to reach "0" at time t6. The engine speed reaches the combustion recoverable rotational speed threshold R1 at time t2. The engine speed enters the resonance band of the internal combustion engine 1 at time t3, and exits the resonance band of the internal combustion engine 1 at time t4.

In FIG. 2, the electromagnetic clutch 11 for the air conditioner (A/C clutch) is disengaged at time t1, at which the automatic stop conditions are met.

The alternator (ALT) 6 stops generating power (power is not generated) from time t1 onward, at which the automatic stop conditions are met in FIG. 2.

When the automatic stop conditions are met, the throttle valve 5 closes in accordance with the amount of reduction in the auxiliary device load due to the stoppage of power generation in the alternator 6 and the stoppage of the air conditioner. That is, at time t1, the throttle valve 5 approaches a closed throttle opening degree by an amount corresponding to the reduction in the load (auxiliary device load) imposed on the internal combustion engine 1 by the auxiliary devices, which are stopped when the automatic stop conditions are met.

From time t2 onward, at which the engine speed falls below the combustion recoverable rotational speed threshold R1, the throttle valve 5 is controlled so as to be fully closed until time t4, at which the engine speed exits the resonance band of the internal combustion engine 1. That is, when the engine speed of the internal combustion engine 1 falls below the combustion recoverable rotational speed threshold R1 while the engine speed is decreasing as the automatic stop conditions are met, the throttle valve 5 is controlled so that the amount of air entering the cylinders is less than before the engine speed fell below the combustion recoverable rotational speed threshold R1.

At time t4, the throttle valve 5 is controlled so as to reach a predetermined first throttle opening degree O1, which is a predetermined large opening degree. The first throttle opening degree O1 is a larger opening degree than a starting throttle opening degree Os, which is set when the internal combustion engine 1 is started.

That is, after the engine speed of the internal combustion engine 1 passes through the resonance band, the throttle valve 5 is controlled so that the amount of air entering the cylinders is greater than when the engine speed of the internal combustion engine 1 passes through the resonance band.

At time t5, the throttle valve 5 is controlled so as to reach the starting throttle opening degree Os when an air pressure in the collector 4 reaches atmospheric pressure.

Figure 3:
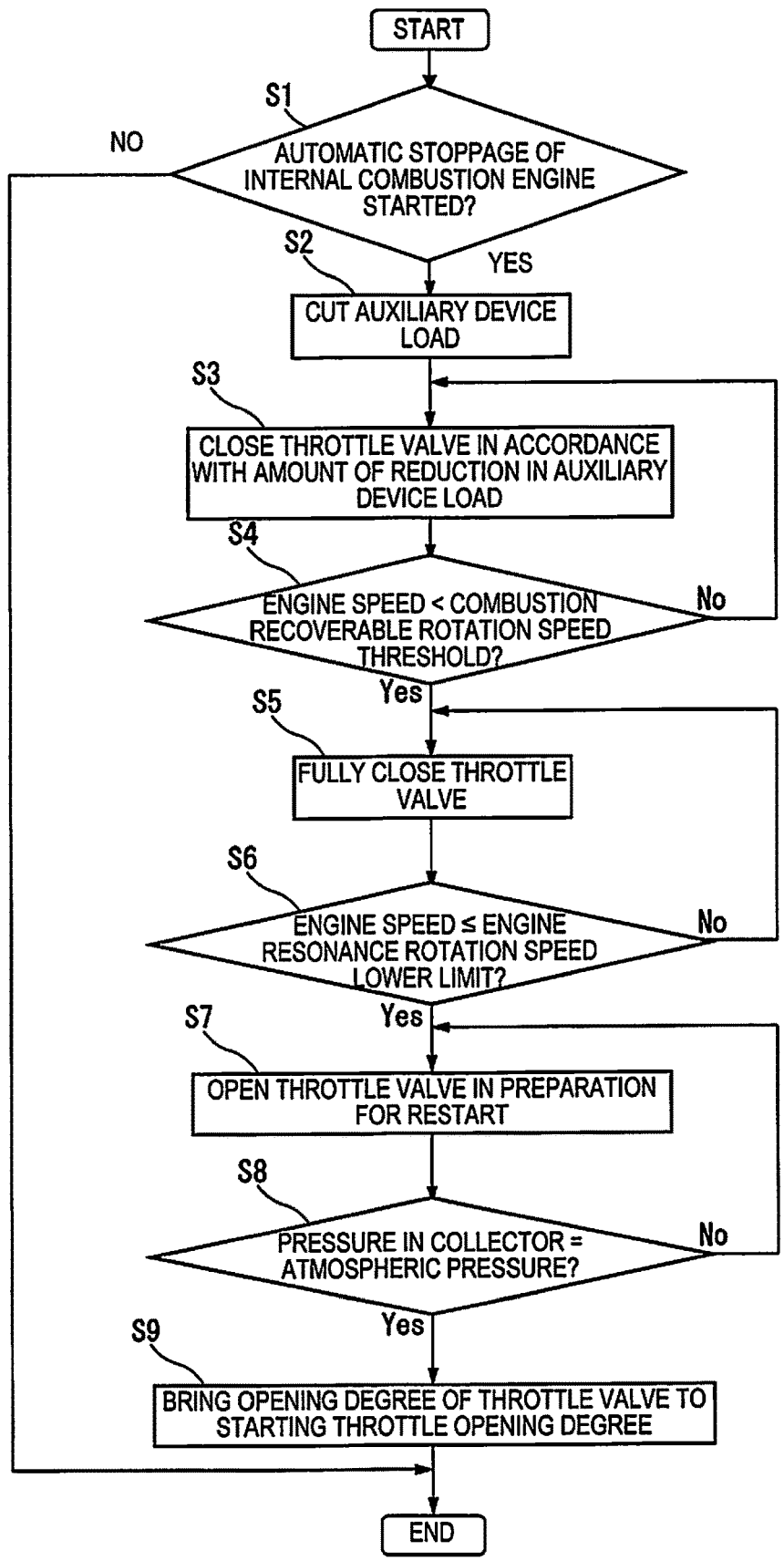
FIG. 3 is a flowchart of a flow of a control for the internal combustion engine according to the present invention.

FIG. 3 is a flowchart of a flow of a control for the internal combustion engine 1 in the embodiment described above.

In step S1, a determination is made as to whether or not the automatic stop conditions of the internal combustion engine 1 have been met and an automatic stoppage of the internal combustion engine 1 has been started. When an automatic stoppage of the internal combustion engine 1 has been started in step S1, the routine advances to step S2. When an automatic stoppage of the internal combustion engine 1 has not been started in step S1, the current routine is ended.

In step S2, the alternator 6, the air conditioner, and the other auxiliary devices are stopped, and the auxiliary device load is cut (reduced).

In step S3, the throttle valve 5 is closed according to the amount of reduction in the auxiliary device load. The amount by which the throttle valve 5 closes increases as the amount of reduction in the auxiliary device load increases.

In step S4, a determination is made as to whether or not the engine speed is lower than the combustion recoverable rotational speed threshold R1. When the engine speed is lower than the combustion recoverable rotational speed threshold R1 in step S4, the routine advances to step S5.

In step S5, the throttle valve 5 is fully closed.

In step S6, a determination is made as to whether or not the engine speed is equal to or less than the engine resonance rotational speed lower limit $R_L$. When the engine speed is equal to or less than the engine resonance rotational speed lower limit $R_L$ in step S6, the routine advances to step S7.

In step S7, the throttle valve 5 is brought to the first throttle opening degree O1, which is a predetermined large opening degree, so that the pressure (air pressure) in the collector 4 reaches atmospheric pressure in preparation for a restart.

In step S8, a determination is made as to whether or not the pressure (air pressure) in the collector 4 has reached atmospheric pressure. When the pressure (air pressure) in the collector 4 is at atmospheric pressure in step S8, the routine advances to step S9.

In step S9, the throttle valve 5 is brought to the starting throttle opening degree Os.

An embodiment of the present invention was described above, but the present invention is not limited to the embodiment described above; various changes can be made inasmuch as such changes do not deviate from the main point of the invention.

In the embodiment described above, the opening degree of the throttle valve 5 is controlled to reduce the amount of air entering the cylinders when the internal combustion engine 1 is automatically stopped, but if the internal combustion engine 1 is provided with a variable valve mechanism capable of changing a valve timing of an air intake valve, the amount of air entering the cylinders may be reduced using this variable valve mechanism. Specifically, a variable valve mechanism may be used as an air amount adjustment part that adjusts the amount of air supplied to the cylinders.

When the internal combustion engine 1 is started in normal circumstances by a driver operating an ignition key, the internal combustion engine 1 may be started using the alternator 6, but the internal combustion engine 1 may also be started by a dedicated starter motor different from the alternator 6.

That is, the internal combustion engine 1 may be provided with a dedicated starter motor different from the alternator 6.

The embodiment described above relates to a method and device for controlling an internal combustion engine.

The invention claimed is:

1. A control method for controlling an internal combustion engine, the control method comprising:
   stopping fuel injection to automatically stop the internal combustion engine when predetermined automatic stop conditions are met;
   starting the internal combustion engine in response a request to restart the internal combustion engine while an engine speed of the internal combustion engine is decreasing due to the automatic stoppage by resuming fuel injection when the engine speed of the internal combustion engine is equal to or greater than a predetermined rotational speed threshold at which restarting is possible only by fuel injection, and by rotating a crankshaft using an electric motor when the engine speed of the internal combustion engine is lower than the rotational speed threshold; and
   controlling an air amount adjustment part configured to adjust an amount of air supplied to cylinders so that an amount of air entering the cylinders is less than before the engine speed fell below the rotational speed threshold when the engine speed of the internal combustion engine falls below the rotational speed threshold while the engine speed is decreasing due to an automatic stoppage.

2. The control method according to claim 1, further comprising
   stopping auxiliary devices and reducing the amount of air entering the cylinders to be less than before the auxiliary devices were stopped when the internal combustion engine is automatically stopped while auxiliary devices are operating.

3. The control method according to claim 1, further comprising increasing the amount of air entering the cylinders after the engine speed passes through a predetermined resonance band of the internal combustion engine so as to be greater than when the engine speed passes through the predetermined resonance band.

4. A control device for controlling an internal combustion engine, the control device comprising:
- an electric motor configured to rotate a crankshaft to start the internal combustion engine;
- an air amount adjustment part configured to adjust an amount of air supplied into cylinders;
- a first control part configured to stop fuel injection to automatically stop the internal combustion engine when predetermined automatic stop conditions are met; and
- a second control part configured to start the internal combustion engine in response a request to restart the internal combustion engine while an engine speed of the internal combustion engine is decreasing due to an automatic stoppage by resuming fuel injection when the engine speed of the internal combustion engine is equal to or greater than a predetermined rotational speed threshold at which restarting is possible only by fuel injection, and by using the electric motor when the engine speed of the internal combustion engine is lower than the rotational speed threshold, the second control part being configured to control the air amount adjustment part when the engine speed of the internal combustion engine falls below the rotational speed threshold while the engine speed is decreasing due to an automatic stoppage so that the amount of air entering the cylinders is less than before the engine speed fell below the rotational speed threshold.

5. The control method according to claim 1, wherein the rotational speed threshold is higher than a rotational speed at which resonance occurs in the internal combustion engine.

\* \* \* \* \*